United States Patent Office 3,529,014
Patented Sept. 15, 1970

3,529,014
PROCESS FOR PREPARING ENOL
ACETATES FROM KETONES
Walter A. Gay, Cheshire, and Desmond Sheehan, Hamden, and Anthony F. Vellturo, Cheshire, Conn., assignors to The Techni-Chem Company, Wallingford, Conn., a corporation of Connecticut
No Drawing. Filed Jan. 30, 1968, Ser. No. 701,535
Int. Cl. C07c 69/14
U.S. Cl. 260—488                                11 Claims

ABSTRACT OF THE DISCLOSURE

Enol acetates are produced by reacting ketones, particularly cyclic ketones, such as cyclohexanone, cyclooctanone and cyclododecanone, with acetic anhydride and a catalyst and ketene in substantially equi-molecular amounts based on the ketone. The acetic anhydride is preferably in excess, and the reaction is carried out at elevated temperatures, such as 100° to 150° C. The reaction goes to completion.

RELATED APPLICATION

The present application is an improvement on the process of the application of Gay and Sheehan, Ser. No. 666,468, filed Sept. 8, 1967, and assigned to the assignee of the present application. In the application referred to, the reaction of acetic anhydride and cyclic ketones is catalyzed by hydriodic acid instead of the more commonly used catalyst, sulfuric acid, p-toluene sulfonic acid, and the like. The hydriodic acid permits more rapid reaction and carries the reaction to a greater percentage yield in a reasonable time based on the ketone than in the case of the other catalysts referred to. The reaction, however, does not proceed to completion or even approximately to completion.

BACKGROUND OF THE INVENTION

Enol acetates have been prepared from ketones, such as cyclic ketones, by reaction with acetic anhydride using common catalysts, such as sulfuric acid, p-toluene sulfonic acid, and the like. Also, as referred to in the related application of Gay and Sheehan set out above, the reaction has been speeded up and carried to a higher percentage yield by the use of hydriodic acid as a catalyst. However, even in the improved process of the Gay and Sheehan application above referred to and other known processes, the reaction does not proceed to completion and requires separation of unreacted ketone and acetic anhydride and repeating the reaction with additional make-up ketone and acetic anhydride. The processes with ordinary catalysts, and even the improved process of the Gay and Sheehan application, however still require separation of unreacted ketone and its treatment with more acetic anhydride. They represent perfectly useful and practical processes, but the cost is increased by the necessity of the separation.

SUMMARY OF THE INVENTION

The present invention relates to an improved process of producing enol acetates from ketones generally, either acyclic or cyclic, in which the reaction with acetic anhydride is carried out quantitatively to completion and no unreacted ketone has to be separated out and retreated. The process of the present invention is equally useful with ordinary catalysts, such as sulfuric acid, p-toluene sulfonic acid, and the like, and the improved hydriodic acid catalyst of the Gay and Sheehan application above referred to. In each case the reaction goes to completion.

Essentially in the present invention ketene is added in substantially equimolecular amounts based on the ketone. While it is known that ketene is capable of reacting with ketones, under ordinary conditions the reaction is much slower than with acetic anhydride, and it is surprising that the present invention permits substantially quantitative reaction based on the ketone with high speed and hence economical output.

The acetic anhydride is present in at least stoichiometrical amounts and preferably in substantial excess, such as a ratio of acetic anhydride to ketone of 2 or 3 to 1. The amount of acetic anhydride at the end of the quantitative reaction is the same as that with which the reaction is started, except of course for negligible mechanical losses. Therefore, if one writes an overall reaction, it appears on paper as if the ketene reacted with the ketone. It is believed, however, that this is not the mechanism of the reaction, because when ketene reacts alone with a ketone the rate of reaction is very much slower. Without wishing to limit the present invention to any particular theory or reaction mechanism, it is believed that acetic anhydride reacts with the ketone to produce the enol acetate and acetic acid and that the ketene reacts almost instantly with the acetic acid to regenerate acetic anhydride, which then reacts with more ketone at the high rate which occurs at the beginning of the other processes using acetic anhydride and ketone with, of course, the proper catalyst. While it is practically certain that the reaction is not one of direct reaction of ketene with ketone, because of the tremendously higher reaction rate, the exact mechanism has not been determined rigorously, and it is possible that some other mechanism may be involved. It seems probable, however, that the rapid reaction of ketene with any acetic acid formed is at least one factor, quite possibly a major factor and conceivably it may even be the only factor. This cannot be determined at the present time, and therefore the invention is not limited to any particular theory.

While the amount of ketene should be substantially at least molecularly equivalent to the ketone, the naure of the ketene addition and its rates are not in the least critical, which permits a very desirable flexibility for practical operation. To illustrate the great flexibility, the acetic anhydride and ketone can be reacted to the maximum equilibrium percentage with the catalyst chosen and then all of the ketene rapidly added, which drives the reaction to completion. Another method is to add the ketene gradually, preferably at at least about the rate at which the enol acetate is formed. Precise reaction rate is in no sense necessary as the reaction will still go to completion if the ketene is introduced somewhat more slowly than enol acetate formation or if it is introduced more rapidly. Two rapid introduction of ketene, which is a gas, can of course lead to certain mechanical problems in the process, and therefore for simplification of operation it is desirable not to add the ketene so fast that large amounts of unreacted ketene are present. This is merely a process convenience and in no sense a limitation on the invention.

The invention can be practiced in batch form, and such processes are both effective and economical as the separation of unreacted ketone is not needed and the step is eliminated without, however, eliminating the function which made it necessary in the past. It is also possible to carry out the reaction in continuous or semi-continuous form, and for some purposes this presents operating advantages. One form of semi-continuous operation is to react acetic anhydride, catalyst and ketone until either the maximum conversion has been achieved or at least a high conversion. This, of course, would involve carrying out this step of the process at the higher temperatures, for example 100° to somewhat over 140°, at which the reaction proceeds best. The mixture of the acetic anhydride, ketone, enol acetate and any acetic acid formed, together with a small amount of catalyst, can then be introduced into a vertical, fractionating type column and ketene gas introduced in the bottom of the column. The rising ketene gas appears to react with any acetic acid which may have been formed; and enol acetate, excess acetic anhydride, and the minute amount of catalyst are withdrawn from the bottom of the column and acetic anhydride and catalyst separated from the enol acetate by well known means, for example distillation.

It is also possible to carry out a continuous process by introducing acetic anhydride, ketone and catalyst into a column somewhere near the mid-point, introducing ketene in the bottom, and maintaining the temperature in the column sufficiently high so that eventually acetic anhydride is volatilized and is recovered from the top of the volumn, while enol acetate is recovered from the bottom of the column associated with small amounts of catalyst, if the catalyst is of relatively low volatility such as sulfuric acid and p-toluene sulfonic acid; or in the case of hydriodic acid the hydriodic acid may pass out principally at the top of the column in gaseous form. The acetic anhydride and hydriodic acid are, of course, condensed and reintroduced into the column with fresh ketone. In this process the volatility of the hydriodic acid catalyst permits a somewhat purer enol acetate than if low volatile catalysts are used. In some cases this modification may be preferred in spite of the greater cost of hydriodic acid. However, it is a great advantage of the present invention that excellent results can be obtained with the cheaper catalysts, such as sulfuric acid. This makes it possible to decide on a catalyst on the basis of economic considerations without having to be so greatly concerned with the chemical results.

The process has been described in purely process terms. Equipment is obviously chosen to provide the necessary residence time, and it may involve multiple introduction points of one or more reagents. Also, it is possible, where necessary, to provide the introduction of volatile, essentially inert, material which may remove heat by volatilization, either from the system as a whole or from local portions which may be overheated. The ketene may be added as a gas or in a suitable solvent.

The present invention does not introduce any change in the amounts of catalyst to be used. They are not critical. In general, amounts from about 4 to 16 mmoles of catalyst per mole of ketone give good results. Larger amounts of catalyst may be used, but do not confer any great benefit and of course increase the cost of operation. Very large amounts of catalyst, such as more than 50 mmoles, which have been used in some processes employing a sulfuric acid catalyst, are not in general preferred in the present invention as they do not improve the efficiency of the process. As a matter of fact, the quite small amounts of catalyst which can be used in some cases present an additional advantage. In modifications where the excess acetic anhydride is removed, as in some of the continous processes referred to above, the enol acetate of the ketone obtained may have only the very small amount of catalyst as a contaminant, and in the case of hydriodic acid even this may not be present. One of the important fields of use for enol acetates of cyclic ketones is to produce certain nitro compounds, and in the reaction the presence of very small amounts of the remaining catalyst do not interfere. It is, therefore, an advantage of the invention that permits the use of very small amounts of catalyst that in some cases it is unnecessary to remove them at all from the final enol acetate obtained. While the removal is not a difficult matter, it still is an additional step, and where it can be eliminated improves to that extent the economies of the process.

The process has been described in connection with the production of enol acetates. This is by far the most important application at the present time. However, other enol alkanoates can be produced from the corresponding anhydrides. For example, enol propionates can be prepared, in which case methyl ketene is used instead of ketene.

DESCRIPTION OF THE PREFERRED EMBODIMENTS

The invention will be described in greater detail in conjunction with the following examples, which are typical and in which the parts are by weight unless otherwise specified. It will be noted that some of the examples are directed to batch operations as in such examples more precise quantitative comparison of figures is possible.

EXAMPLE 1

A reaction mixture of 3 moles of acetic anhydride and 1 mole of cyclohexanone and 5.4 mmoles of sulfuric acid were heated at 100° C. About 50% conversion to the enol acetate resulted in about 2 hours. If a mole of ketene is added during the reaction, the conversion becomes quantitative in a period of time less than 90 minutes, depending on the way in which the ketene is added. If it is added at a sufficient rate which is comparable to the rate of enol acetate formation, the time to complete conversion is greatly reduced. Slower additions of ketene require somewhat longer time.

EXAMPLE 2

The procedure of Example 1 was repeated, reducing the amount of sulfuric acid to 4.0 mmoles and raising the temperature to 140° C. In about an hour 66% conversion to the enol acetate resulted, but when ketene was added as is described in Example 1 quantitative conversion resulted in a time substantially less than an hour.

EXAMPLE 3

The procedure of Example 2 was repeated, replacing the sulfuric acid with an equivalent amount of p-toluene sulfonic acid. The results were substantially the same as in Example 2 but the reaction rate was a little slower.

EXAMPLE 4

The procedure of Example 2 was repeated, replacing the 4.0 mmoles of sulfuric acid with 5.4 mmoles of hydriodic acid. With the ketene addition, complete conversion resulted in shorter time than in Example 1. Again the exact time depended somewhat on rate of addition of ketene.

EXAMPLE 5

The procedure of Example 2 was repeated, replacing the cyclohexanone with an equivalent amount of cyclododecanone. When no ketene was added the conversion obtained was lower than in Example 2. With ketene addition the conversion became quantitative but the rate of reaction was somewhat slower than with cyclohexanone.

EXAMPLE 6

The procedure of Example 2 was repeated, substituting for the cyclohexanone an equivalent amount of cyclooctanone. Conversion was substantially better than with cyclododecanone and in fact for short times actually slightly faster than with cyclohexanone. With ketene addition the conversion became quantitative in a time about the same as Example 2, dependent on the rate of ketene addition.

EXAMPLE 7

The procedure of Example 2 was repeated without any ketene and the hot mixture of acetic anhydride, cyclohexanone and cyclohexanone enol acetate was introduced into about the mid-point of a column maintained at a temperature somewhat below 140° C. Ketene was introduced continuously at the bottom of the column at a rate such that 1 mole of ketene was introduced per mole of cyclohexanone during the time of passage of the hot cyclohexanone-acetic anhydride mixture to the bottom of the column. At the bottom of the column a mixture of acetic anhydride and cyclohexanone enol acetate was obtained with the small amount of sulfuric acid catalyst. The amount of acetic anhydride was substantially the same as at the start, as was the case with the other examples.

EXAMPLE 8

The procedure of Example 7 was repeated but the column was maintained at a temperature above the boiling point of acetic anhydride, and acetic anhydride and cyclohexanone in the proportions given were introduced at the top of the column. Cyclohexanone enol acetate was removed from the bottom of the column contaminated with a small amount of sulfuric acid but substantially free from acetic anhydride, which distilled off the top of the column together with any slight excess of ketone which was present. The acetic anhydride vapors were condensed and mixed with additional amount of cyclohexanone and sulfuric acid catalyst and recycled.

We claim:

1. In a process of preparing an enol alkanoate of an alicyclic ketone in which the keto group is a part of the ring which comprises reacting the ketone at an elevated temperature with an alkanoic acid anhydride and a catalytic amount of a strong acid reaction catalyst, the improvement which comprises employing the alkanoic acid anhydride in a molar excess based on the ketone and adding to the reaction mixture a ketene corresponding to the alkanoic acid of said anhydride in an amount at least substantially stoichiometrical based on the ketone.

2. A process according to claim 1 in which the anhydride is acetic anhydride.

3. A process according to claim 2 in which the cyclic ketone is cyclohexanone.

4. A process according to claim 2 in which the cyclic ketone is cyclododecanone.

5. A process according to claim 2 in which the ketone is cyclooctanone.

6. A process according to claim 2 in which the reaction temperature is between 100° C. and the boiling point of acetic anhydride.

7. A process according to claim 2 in which the catalyst is sulfuric acid.

8. A process according to claim 2 in which the ketene is introduced into the reaction mixture substantially continuously as enol acetate is produced.

9. A process according to claim 3 in which the ketene is introduced into the reaction mixture substantially continuously as enol acetate is produced.

10. A process according to claim 4 in which the ketene is introduced into the reaction mixture substantially continuously as enol acetate is produced.

11. A process according to claim 5 in which the ketene is introduced into the reaction mixture substantially continuously as enol acetate is produced.

References Cited

UNITED STATES PATENTS

| | | | |
|---|---|---|---|
| 2,684,980 | 7/1954 | Mawer | 260—488 |
| 3,043,862 | 7/1962 | Altenschopfer et al. | 260—488 |

LORRAINE A. WEINBERGER, Primary Examiner

V. GARNER, Assistant Examiner